United States Patent
Kawakami et al.

(10) Patent No.: US 6,799,651 B2
(45) Date of Patent: Oct. 5, 2004

(54) ATTACHING STRUCTURE OF A BRAKE FLUID PRESSURE GENERATOR

(75) Inventors: Hiroo Kawakami, Wako (JP); Toru Otani, Wako (JP); Goro Tsujino, Wako (JP); Keisuke Miyahara, Wako (JP); Masateru Momozu, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 88 days.

(21) Appl. No.: 10/194,844

(22) Filed: Jul. 11, 2002

(65) Prior Publication Data

US 2003/0066699 A1 Apr. 10, 2003

(30) Foreign Application Priority Data

Oct. 5, 2001 (JP) .................................. 2001-309745

(51) Int. Cl.[7] .................................................. G05G 1/14
(52) U.S. Cl. ......................................... 180/90; 74/512
(58) Field of Search ............................. 180/90; 74/512, 74/513, 560

(56) References Cited

U.S. PATENT DOCUMENTS

| | | | | |
|---|---|---|---|---|
| 4,662,237 A | * | 5/1987 | Kami et al. .................. | 74/512 |
| 5,120,106 A | * | 6/1992 | Sakurai et al. ......... | 296/193.02 |
| 6,585,068 B2 | * | 7/2003 | Matsushita .................... | 180/90 |
| 6,591,927 B1 | * | 7/2003 | Honekamp et al. ........... | 180/90 |
| 2002/0170761 A1 | * | 11/2002 | Honekamp et al. ........... | 180/90 |

FOREIGN PATENT DOCUMENTS

JP U2602394 11/1999

* cited by examiner

Primary Examiner—Jack W. Keith
Assistant Examiner—Gabriel S. Sukman
(74) Attorney, Agent, or Firm—Merchant & Gould P.C.

(57) ABSTRACT

A structure for attaching a brake fluid pressure generator to a vehicle. The brake fluid pressure generator is attached to a dash panel provided at the rear side of a damper housing, which divides a compartment of a vehicle into a cabin and an engine room. An installation hole, through which the brake fluid pressure generator is inserted, is formed on the dash panel to one side of the engine. A mounter, which accommodates at least part of the brake fluid pressure generator, is used for detachably attaching the brake fluid pressure generator to the dash panel from the cabin side. Thereby, part of the brake fluid pressure generator is positioned at the rear side of the dash panel, and the outline of the brake fluid pressure generator is positioned so that it might overlap the damper housing when viewed from the fore side direction with respect to the vehicle.

7 Claims, 4 Drawing Sheets

ATTACHING STRUCTURE OF A BRAKE FLUID PRESSURE GENERATOR

BACKGROUND OF THE INVENTION

1. Field of the Invention

The present invention relates to an attaching structure for a brake fluid pressure generator to be attached to the dash panel by which the car body construction is divided into an engine room and a cabin. More specifically, the present invention relates to an attaching structure for a brake fluid pressure generator to be attached to the dash panel at the vicinity of the damper housing.

2. Related Art

In vehicle body construction, it is known conventionally to position a dash panel that divides the inside space of a vehicle into an engine room and a cabin space as forward as possible, in order to make the cabin space as wide as possible. Especially, widened cabin space can be obtained in vehicle body construction when the dash panel is located near the damper housing, into which the damper of suspension for left and right wheel is provided.

As one measure of protecting against an impact from a forward direction with respect to the vehicle, the technique of providing a space at the backside of the engine for absorbing the impact by shifting the engine in the rear side direction with respect to the vehicle, has been known.

When this technique is adopted for a vehicle having the above described vehicle body construction, since the space for allowing the backward shifting of the engine is required in the engine room, it is unfavorable if parts of large size are arranged in the engine room. In other words, it is unfavorable if parts of large size are arranged in the engine room, especially between the dash panel and the engine, because the backward shifting of the engine during a head-on collision etc. is blocked.

SUMMARY OF THE INVENTION

The present invention relates to an attaching structure for a brake fluid pressure generator, which enables easy installation of the brake fluid pressure generator, and maintains space for allowing backward shifting of the engine for the driver's safety.

The present invention relates to an attaching structure of a brake fluid pressure generator, which generates a brake fluid pressure in compliance with the operative force exerted by the driver during operation of the brake. This brake fluid pressure generator is attached to a dash panel provided near the rear side of a damper housing that divides a compartment of a vehicle into a cabin and an engine room.

In this attaching structure, an installation hole, through which the brake fluid pressure generator is inserted, is formed on the dash panel to one side of the engine in the width direction. A mounter which accommodates at least part of the brake fluid pressure generator is used for detachably attaching the brake fluid pressure generator to the dash panel from the cabin side. Thereby, part of the brake fluid pressure generator is positioned at the rear side of the dash panel, and the outer diameter of the brake fluid pressure generator is positioned so that it might be overlapped with the damper housing, when looked from the forward direction with respect to the vehicle. In the present invention, preferably, a depression for avoiding direct contact with the brake fluid pressure generator after attaching to the dash panel is formed on the damper housing, so that the outer diameter shape of attaching structure overlaps when viewed from the top side. With such a depression on the damper housing, projection of the brake fluid pressure generator into the engine room is allowed, so that projection of the brake fluid pressure generator into the cabin is shortened by a similar amount. Thus, a widened cabin space can be obtained.

DESCRIPTION OF THE PRESENT EMBODIMENT

Figure 1:
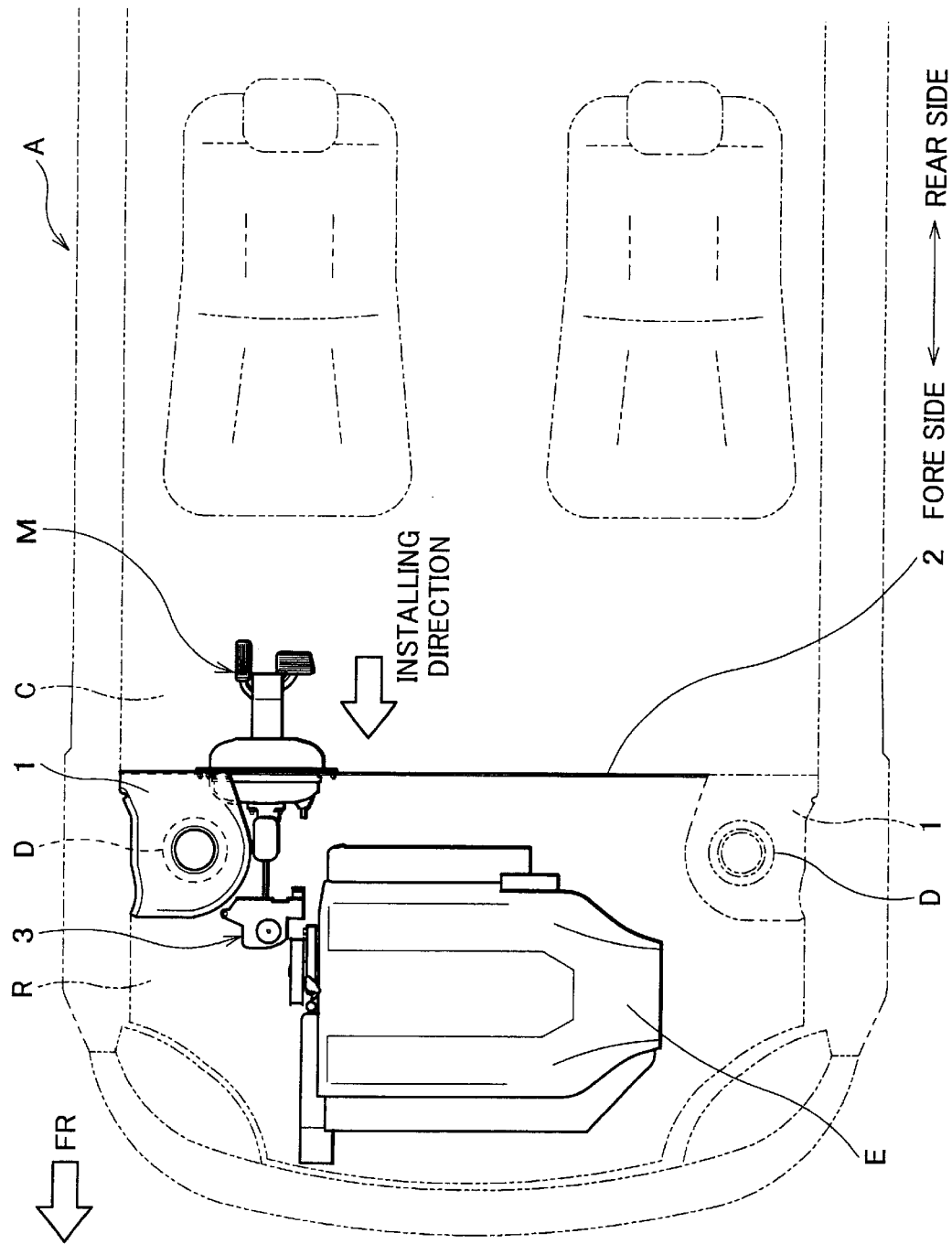
FIG. 1 is a schematic plan view of a vehicle adopting the attaching structure of the brake fluid pressure generator according to the present invention.
Figure 2:
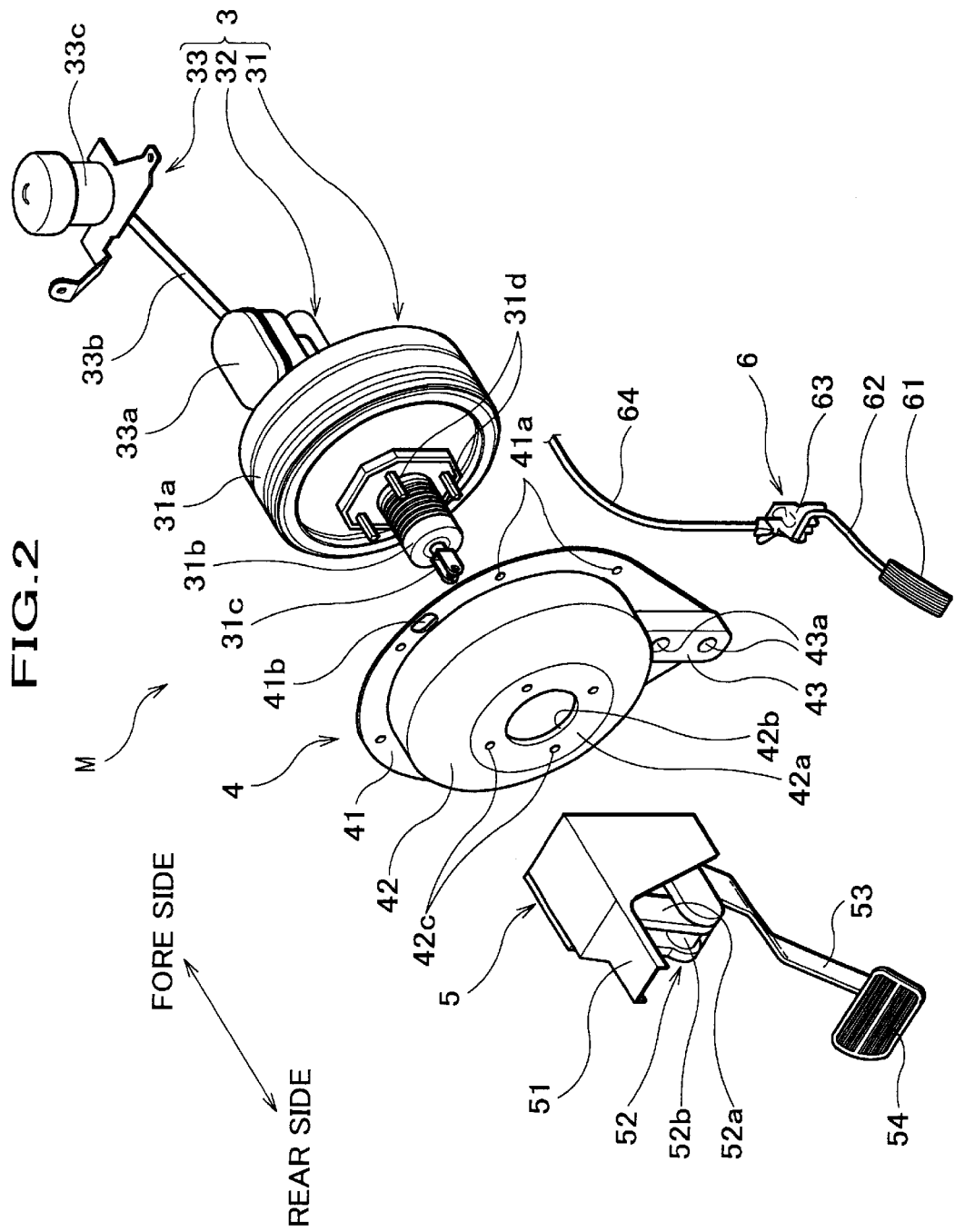
FIG. 2 is a perspective view showing the whole pedal module according to the present embodiment.
Figure 3:
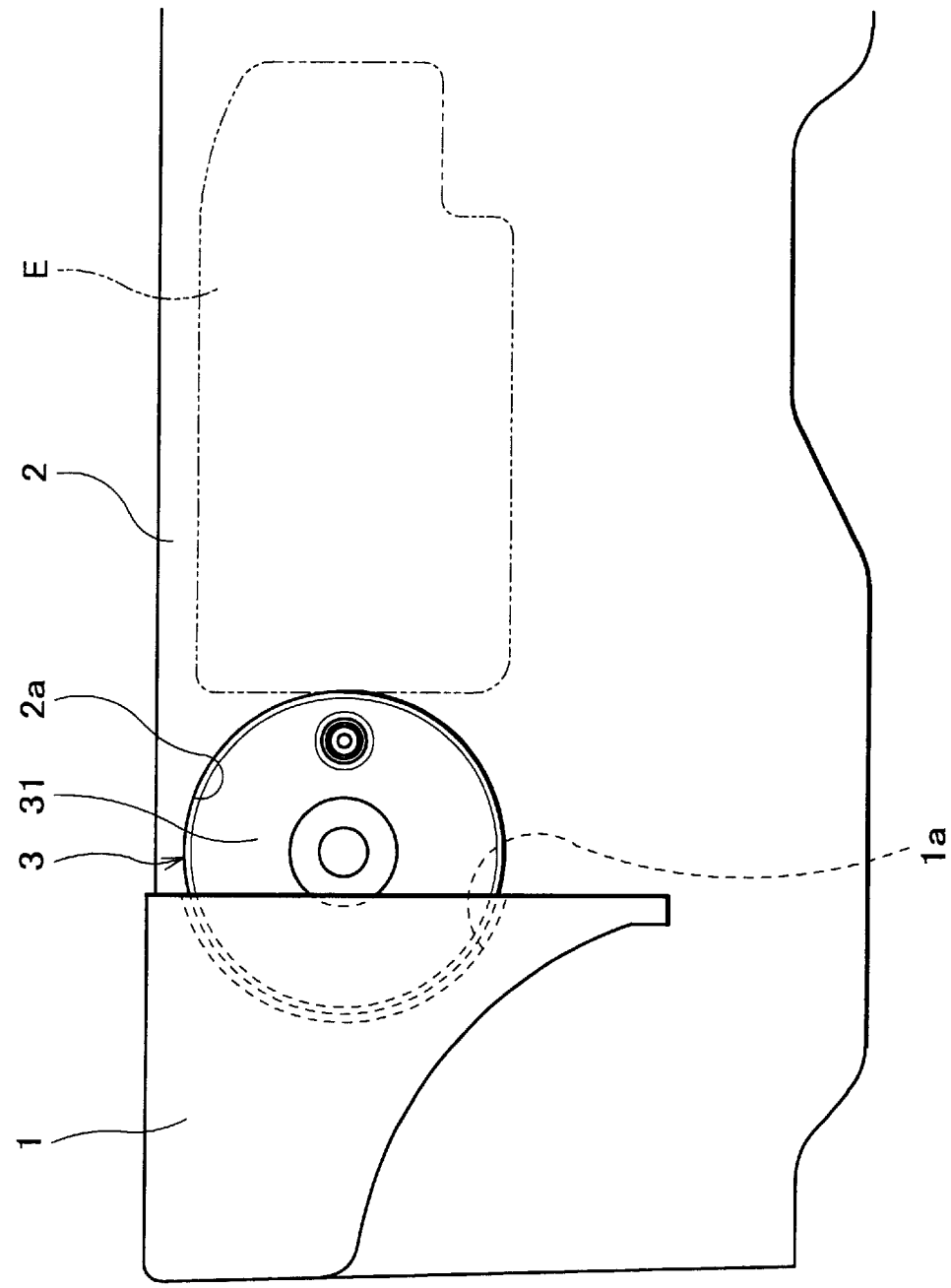
FIG. 3 is a view of the brake fluid pressure generator from the front side of the vehicle.
Figure 4:
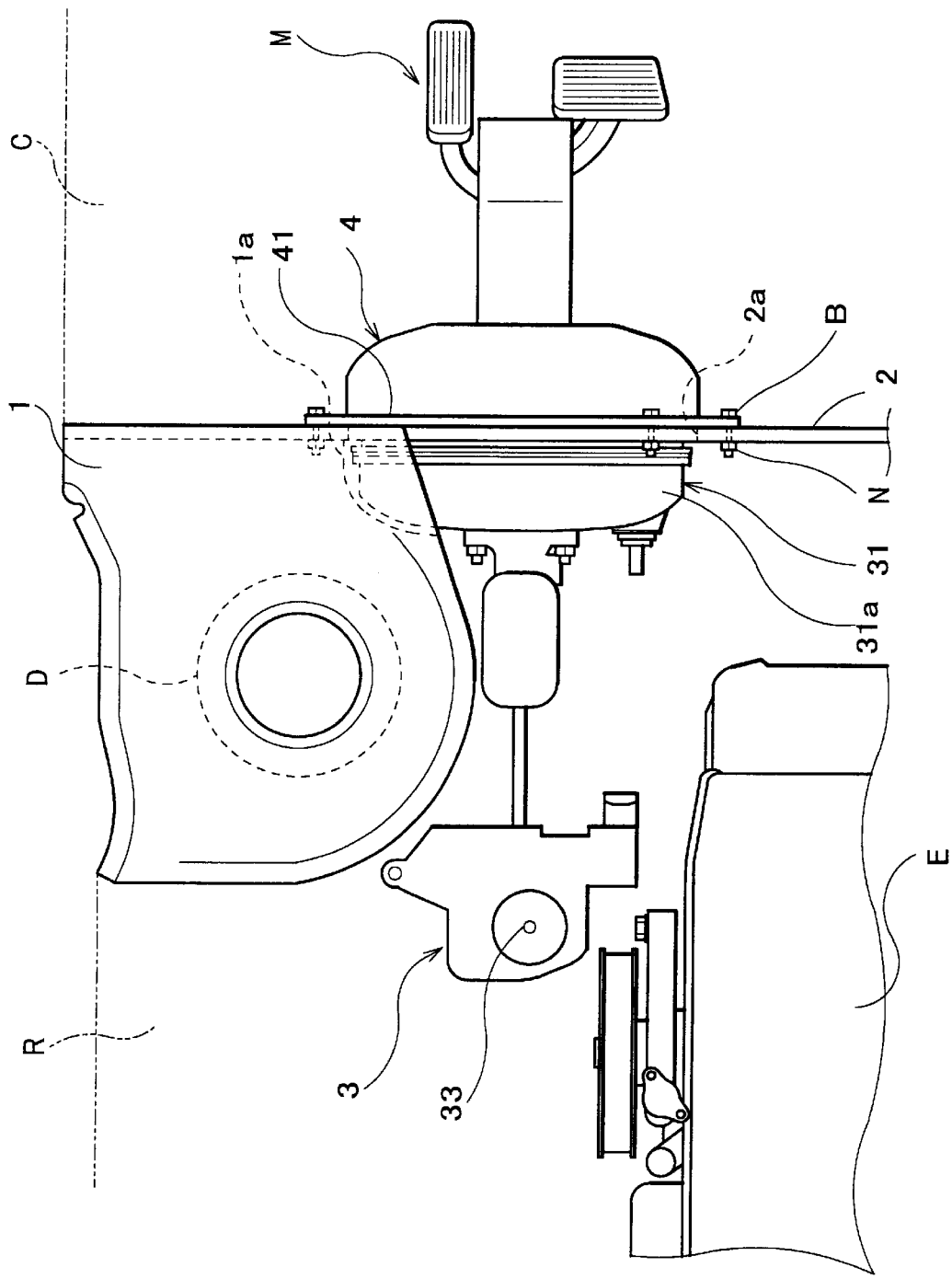
FIG. 4 is an enlarged plan view showing part of the assembling structure of the brake fluid pressure generator shown in FIG. 1.

The preferred embodiment of an attaching structure for a brake fluid pressure generator according to the present invention will now be described by referring to the attached drawings. FIG. 1 is a schematic plan view of a vehicle adopting the attaching structure of the brake fluid pressure generator according to the present invention. FIG. 2 is a perspective view showing the whole pedal module according to the present embodiment. FIG. 3 is view of the brake fluid pressure generator from the front side of the vehicle. FIG. 4 is an enlarged plan view showing part of the attaching structure of the brake fluid pressure generator shown in FIG. 1.

As shown in FIG. 1, a vehicle A has a cabin C, an engine room R and an engine E. The cabin C is a room for passengers and a driver of a vehicle. The engine room R is disposed in front of the cabin C and accommodates the engine E at the center thereof.

In this vehicle A, a dash panel 2 is disposed at the rear side vicinity of a damper housing 1, to which damper D of the front suspension is connected. This dash panel 2 divides the compartment of the vehicle into the cabin C and the engine room R.

A pedal module M, which has pedals for accelerating and stopping the vehicle A, a brake fluid pressure generator 3, and the like, is attached to the dash panel 2. The brake fluid pressure generator 3 assists the driver's brake operation by generating brake fluid pressure in compliance with the operative physical force applied by a driver. These components of the pedal module M are assembled and united into integral body.

To be more precise, as shown in FIG. 2, the pedal module M is composed of the brake fluid pressure generator 3, a mounter 4, a brake assembly 5, and an accelerator assembly 6.

As shown in FIG. 1, the brake fluid pressure generator 3 side of the pedal module M will be located at the fore side of the pedal module M with respect to the vehicle when the pedal module M is attached to the dash panel 2. Thus, in the following explanation, the side of the pedal module M with the brake fluid pressure generator 3 threat is defined as "fore side" of the pedal module M, and the opposite side of the pedal module M is defined as "rear side".

The brake fluid pressure generator 3 has a booster 31, a master cylinder 32, and reservoir 33.

The booster 31 is a vacuum-type booster, which generates the thrust for assisting the braking force according to the operation of the brake pedal. A piston to be actuated by the thrust added from the vacuum-type booster 31 is accommodated in the master cylinder 32, which acts as the output port. In this brake fluid pressure generator 3, the brake fluid pressure is sent from the master cylinder 32 in compliance with the driver's brake operation, when the operative force applied by a driver is added to that of the booster 31.

The booster 31 has a body part 31a, an air intake 31b, and a rod 31c. As can be seen from FIG. 1, the diameter of the body part 31a of the booster 31 is larger than the gap between the damper housing 1 and the engine E. The body part 31a has a pressure-variable chamber and a pressure-constant chamber. Outside air is suctioned into a hollow circular cylinder of the pressure-variable chamber by actuating the valve provided inside of the air intake 31b. The pressure-constant chamber is adjusted at the constant decreased pressure and is joined to the intake manifold of the engine E. A rod 31c controls the opening and closing of the valve provided within the air intake is 31b.

The master cylinder 32, as shown in FIG. 2, is attached to the fore-side end of the body part 31a and male screws 31d are provided at the rear-side end of the body part 31a for attachment and positioning.

The reservoir 33 has a supply tank 33a, piping 33b, and a reserve tank 33c. The supply tank 33a directly supplies the brake fluid to the master cylinder 32. The piping 33b is attached to the fore side end of the supply tank 33a, and extends in the fore side upper direction. The reserve tank 33c is attached at the fore side tip end of the piping 33b. In the reserve tank 33c, the brake fluid to be supplied to the supply tank 33a is stored. The mounter 4 has a fixing part 41, a shell cover 42, and a cradle 43.

The fixing part 41 is to be fitted on the dash panel 2 for fixing the mounter 4. The shell cover 42 is a cover placed at the center of the fixing part 41, and has a cylindrical shape with its bottom on the rear side, the fore side end thereof being open. This shell cover 42 is formed by molding and has a suitable depth so as to cover the rear side half of the body part 31a of the booster 31. In other words, any depth may be appropriate as long as the protruding part from the dash panel 2 of the booster 31 is covered by the shell cover 42. The cradle 43 is arranged at the bottom side end of the shell cover 42.

A plurality of round screw holes 41a and oblong holes 41b are bored in suitable positions on the fixing part 41 for attaching the mounter 4 to the dash panel 2 using bolts and the like. An attaching face 42a is formed at the rear side end of the shell cover 42, and is arranged perpendicularly to the fore-and-rear side directions. A through-hole 42b is bored on this attaching face 42a for the air intake 31b of the booster 31 to pass therethrough, and holes 42c are also bored on the attaching face 42a for attaching and positioning the brake assembly 5. Screw holes 43a are provided at suitable positions in the cradle 43 for attaching the accelerator assembly 6.

The brake assembly 5 has a bracket 51, a link mechanism 52 to be stored in the bracket 51, a brake arm 53 to be connected with the link mechanism 52 at one end thereof, and a brake pedal 54 to be attached to the other end of the brake arm 53. On the fore side face of the bracket 51, holes (not shown), similar to the through hole 42b and holes 42c formed on the attaching face 42a of the mounter 4, are also provided. To be more precise, the positions and sizes of these holes formed on the bracket 51 are established so as to be aligned with the corresponding through hole 42b or holes 42c formed on the attaching face 42a.

The link mechanism 52 has a L-like shape when viewed from the side, and has an arm 52a, a shaft 52b, and a linkage (not shown). One end of the arm 52a is connected to the rod 31c of the booster 31. The shaft 52b rotatably supports the crook of the arm 52a. The linkage is provided between the other end of the arm 52a and the 54 of the brake arm 53, at the opposite end from the brake pedal.

In this brake arm 53, the end part to be connected to the linkage serves as the point of connection. A supporting shaft (not shown) rotatably supporting a position between linkage end of the brake arm 53 and the brake pedal 54 serves as the point of support. Operative force is applied by the driver to the pedal 54. Thereby, in the brake assembly 5, the operative force applied by the driver is transmitted using leverage.

In the brake assembly 5 having these constructions, the position of the brake arm 53 and the pedal 54 in the cabin C can be moved further forward than in a conventional brake assembly, in which the rod of the booster is directly connected without an additional link mechanism and the operative force applied by a driver is directly transmitted to the booster 3. Thus, with the present invention a wider cabin space can be obtained.

The accelerator assembly 6 has an accelerator pedal 61, an accelerator arm 62 to be attached to the accelerator pedal 61 at tip end thereof, and a bracket 63. The base end of the accelerator arm 62 is pivotably supported by the bracket 63. A cable 64 for transmitting the input from the accelerator pedal 61 to the slot valve (not shown) of the engine E is connected to the bracket 63. Holes (not shown), which correspond to the screw holes 43a in the cradle 43 of the mounter 4, are also bored in the bracket 63. To be more precise, the positions and sizes of these holes formed on the bracket 63 are established so as to align with the corresponding screw holes 43a formed on the cradle 43. Thereby, the accelerator assembly 6 is fixed on the cradle 43 by bolts, etc. at these screw holes.

As shown in FIG. 3, an installation hole 2a, at which the brake fluid pressure generator 3 is installed, is formed on the dash panel 2. With this arrangement of the installation hole 2a, as shown in FIG. 3, almost the entire left half of the brake fluid pressure generator 3 is hidden by the damper housing 1 when viewing from the forward direction with respect to the vehicle. As shown in FIG. 3 and FIG. 4, a depression 1a is formed on the damper housing 1 for avoiding direct contact between the damper housing 1 and the brake fluid pressure generator 3. Thereby, the brake fluid pressure generator 3 can be installed without interference.

The sequence of installation for the brake fluid pressure generator 3 is explained below.

As shown in FIG. 2, first, the air intake 31b and the male screw 31d of the booster 31 are inserted into the through hole 42b and holes 42c of the mounter 4, respectively. Then, the holes (not shown) formed on the brake assembly 5 are engaged with the air intake 31b and male screws 31d, which project the mounter 4.

Next, one end of the arm 52a of the link mechanism 52 is connected with the rod 31c projecting into the bracket 51 of the brake assembly 5.

Then, a nut (not shown) is threaded onto the male screw 31d to projecting into the bracket 51. Thereby, the brake fluid pressure generator 3, a mounter 4, and the brake assembly 5 are all united into an integral body.

Next, the cable 64 extending from the accelerator assembly 6 is passed through the oblong hole 41b of the fixing part 41 of the mounter 4, so that the pedal module M is assembled. After assembling the pedal module M, as shown in FIG. 1, the pedal module M is detachably attached to the dash panel 2 from the cabin C side. To be more precise, as shown in FIG. 4, the brake fluid pressure generator 3 is inserted into the installation hole 2a formed on the dash panel 2, and is fixed to the dash panel 2 by bolting at the fitting face 41 of the mounter 4. Thereby the brake fluid pressure generator 3 is detachably attached to the dash panel 2.

Approximately the rear half of the body part 31a of the booster 31 is positioned rearward of the dash panel 2, and the remaining fore side half of the body part 31a is positioned forward of the dash panel 2. In the present embodiment, part of the fore side half of the body part 31a is positioned within the depression 1a formed on the damper housing 1. Thus, it might appear as if the depression 1a and the damper housing 1 are overlapping each other in the top plan view.

In the present embodiment, furthermore, when the attaching structure of the booster 31 is viewed from the fore direction with respect to the vehicle, the booster 3 is positioned just in the left side of the engine E, and the left half thereof is hidden behind the damper housing 1. As shown in FIG. 4, furthermore, the reservoir 33, arranged at the fore side upper part with respect to the brake fluid pressure generator 3, is positioned within the engine room R.

According to the present invention, advantages can be obtained, as described below.

In the present invention, the booster 31 of the brake fluid pressure generator 3 is positioned just to the left side with respect to the engine E, and part of it is hidden behind the damper housing 1 when the brake fluid pressure generator 3 is viewed from the fore side direction with respect to the vehicle. Thus, a space between the engine E and the dash panel 2 is provided. Thereby, backward shifting of the engine E within the space is enabled, and the impact of a head-on collision, etc. is absorbed at this space.

In the present invention, furthermore, the damper housing 1 is positioned in front of the booster 31 of the brake fluid pressure generator 3 so that they might be overlap each other. Thus, the brake fluid pressure generator 3 can be prevented from intruding into the cabin C in a head-on collision, etc., because the impact from the collision is absorbed at the damper housing 1 and the damper D, etc. by their deformation. Thereby, the driver of the vehicle is protected from injury.

In the present invention, additionally, the brake fluid pressure generator 3 is easily installed, because the brake fluid pressure generator 3 is detachably attached to the dash is panel and the installing operation is performed from the cabin C side.

Also, since the reservoir 33 of the brake fluid pressure generator 3 is provided within the engine room R, maintenance and the checkup of the reserved brake-fluid can easily be made from the engine.

In the present invention, the depression 1a is formed on the damper housing 1, and approximately the fore half of the body part 31a of the booster 31 is positioned within the engine room R. Thus, the shell cover 42 of the mounter can be formed with a depth such that only approximately the rear half of the body part 31a of the booster 31 is covered.

Thereby, the space of the cabin C can be wider than with a conventional installation manner, in which whole of the body part 31a of the booster 31 is covered by the mounter 4. In other words, according to the present invention, since almost half of the brake fluid pressure generator is positioned in the engine room, the depth of the shell cover 42 can be shallow. Thus, the space of the cabin C can be made wider by a similar amount.

The present invention is not restricted to the above described embodiment, and is represented by various embodiments. In the present embodiment, the depression 1a is formed on the damper housing 1, but any type of construction can be adoptable as long as the outline of the brake fluid pressure generator overlaps with the damper housing.

As an example, a mounter which covers the whole of the booster of the brake fluid pressure generator, can be used. In this case, it is preferable that the depression is formed on the damper housing to yield a wider cabin space.

The shapes or materials of each component of the brake fluid pressure generator and the mounter and so on can be varied as necessary.

When a brake fluid pressure generator with a larger diameter than the gap between the engine and the damper housing is installed on the vehicle, the brake fluid pressure generator is attached to the dash panel by inserting it into the installation hole from the cabin side and fixing it to the dash panel using a mounter having a suitable size for covering the booster. Thus, the booster is positioned to one side of the engine, in the width direction.

Thereby, installation of the brake fluid pressure generator is achieved with ease while maintaining the space between the engine E and the dash panel 2 for allowing the backward shifting of the engine, even when the dash panel is located just to the rear side of the damper housing.

In the present invention, since the damper housing is positioned as if it might be overlapped by the brake fluid pressure generator at the rear side thereof, the load from a collision, etc. is absorbed by the damper housing and the damper, and the brake fluid pressure generator can be prevented from moving backward.

In the present invention, furthermore, since the brake fluid pressure generator is detachably attached to the dash panel from the cabin side, the brake fluid pressure generator may be easily installed on a vehicle.

According to the present invention, since the depth of the shell cover of the mounter is shallow, the cabin space of the vehicle can be made wider by a similar amount.

What is claimed is:

1. A brake fluid pressure generator attaching structure for a vehicle, wherein said brake fluid pressure generator generates a brake fluid pressure in compliance with an operative force of brake operation by a driver, said attaching structure comprising:

a dash panel dividing an interior of a body of the vehicle into a vehicle cabin and an engine compartment, said dash panel being disposed behind a damper housing;

an installation hole, defined in said dash panel with said brake fluid pressure generator inserted, therethrough; and a mounter, enclosing at least part of said brake fluid pressure generator, said mounter detachably attaching said brake fluid pressure generators to said dash panel from a cabin side thereof;

wherein:

said installation hole is defined such that when said brake fluid pressure generator is inserted therethrough, said brake fluid pressure generator is positioned to one side of an engine of said vehicle, so as to define a space between said engine and said dash panel unobstructed by said brake fluid pressure generator.

2. A brake fluid pressure generator attaching structure according to claim 1, wherein said damper housing defines a depression therein such that said damper housing does not directly contact said brake fluid pressure generator, and such that said brake fluid pressure generator overlaps said damper housing as viewed from a fore side of said vehicle.

3. A brake fluid pressure generator attaching structure according to claim 1, wherein said a brake fluid pressure generator is connected to a brake pedal through a linkage, such that an operative force applied by the driver's brake operation is transmitted to said brake fluid pressure generator through said linkage.

4. A brake fluid pressure generator attaching structure according to claim 1, wherein said installation hole is defined and said mounter is configured such that said brake fluid pressure generator is installable from a cabin side of said dash panel.

5. A brake fluid pressure generator attaching structure for a vehicle, wherein said brake fluid generator generates a brake fluid pressure in compliance with an operative force of brake operation by a driver, said attaching structure comprising;

a dash panel dividing an interior of a body of the vehicle into a vehicle cabin and an engine compartment, said dash panel being disposed behind a damper housing;

an installation hole, defined in said dash panel with said brake fluid pressure generator inserted therethrough; and a mounter, enclosing at least part of said brake fluid pressure generator, said mounter detachably attaching said brake fluid pressure generator to said dash panel, from a cabin side thereof;

wherein:

said damper housing defines a depression therein such that said damper housing does not directly contact said brake fluid pressure generator;

whereby said brake fluid pressure generator is detachably attachable to said dash panel with said mounter without interference said damper housing and when said brake fluid pressure generator is attached at least a part of said brake fluid pressure generator is obscured by said damper housing when said attaching structure is viewed from a fore side of said vehicle; and said installation hole is defined such that when said brake fluid pressure generator is inserted therethrough said brake fluid pressure generator is positioned to one side of an engine of said vehicle, so as to define a space between said engine and said dash panel unobstructed by said brake fluid pressure generator.

6. A brake fluid pressure generator attaching structure according to claim 5 wherein said installation hole is defined and said mounter is configured such that said brake fluid pressure generator is installable from a cabin side of said dash panel.

7. A brake fluid pressure generator attaching structure for a vehicle, wherein said brake fluid pressure generator generates a brake fluid pressure in compliance with an operative force of brake operation by a driver, said attaching structure comprising:

a dash panel dividing an interior of a body of the vehicle into a vehicle cabin and an engine compartment, said dash panel being disposed behind a damper housing;

an installation hole defined in said dash panel with said brake fluid pressure generator inserted therethrough; and a mounter, enclosing at least part of said brake fluid pressure generator, said mounter detachably attaching said brake fluid pressure generator to said dash panel from a cabin side thereof;

wherein:

said installation hole is defined and said mounter is configured such that said brake fluid pressure generator is installable from a cabin side of said dash panel.

* * * * *